United States Patent
Steed

Patent Number: 5,911,290
Date of Patent: Jun. 15, 1999

[54] STEP MOTOR ACTUATED CONTINUOUS VARIABLE SHOCK ABSORBER

[75] Inventor: David L. Steed, Perrysburg, Ohio

[73] Assignee: Tenneco Automotive Inc., Lake Forest, Ill.

[21] Appl. No.: 08/803,224

[22] Filed: Feb. 20, 1997

[51] Int. Cl.⁶ .................................................. F16F 9/34
[52] U.S. Cl. ......................... 188/282.4; 188/322.15; 188/322.22; 188/317; 188/266.4
[58] Field of Search ............... 188/282.4, 282.3, 188/282.2, 282.1, 282.5, 282.9, 282.8, 266.1, 266.4, 266.5, 266.6, 322.15, 322.22, 320, 281, 280, 317, 319.1, 319.2, 285, 312; 280/5.519, 5.515, 5.512, 124.101; 701/37–38; 267/218

[56] References Cited

U.S. PATENT DOCUMENTS

| | | |
|---|---|---|
| 2,015,758 | 10/1935 | Moulton ................................. 188/317 |
| 3,561,575 | 2/1971 | Allinquant .............................. 188/314 |
| 3,756,357 | 9/1973 | Graff et al. . |
| 3,757,910 | 9/1973 | Palmer . |
| 3,981,380 | 9/1976 | Andre . |
| 4,036,319 | 7/1977 | Andre . |
| 4,096,928 | 6/1978 | Krafzig et al. . |
| 4,113,072 | 9/1978 | Palmer . |
| 4,121,704 | 10/1978 | Nicholls . |
| 4,423,800 | 1/1984 | Kobiske et al. . |
| 4,610,332 | 9/1986 | Mourray . |
| 4,826,207 | 5/1989 | Yoshioka et al. . |
| 4,834,223 | 5/1989 | Kawamura et al. . |
| 4,854,429 | 8/1989 | Casey . |
| 4,890,858 | 1/1990 | Blankenship . |
| 4,943,083 | 7/1990 | Groves et al. ....................... 188/266.1 |
| 4,953,671 | 9/1990 | Imaizumi ............................. 188/266.3 |
| 5,018,608 | 5/1991 | Imaizumi ............................. 188/282.5 |
| 5,123,671 | 6/1992 | Driessen et al. ..................... 188/266.8 |
| 5,285,878 | 2/1994 | Scheffel et al. . |
| 5,372,224 | 12/1994 | Samonil et al. . |

*Primary Examiner*—Douglas C. Butler
*Attorney, Agent, or Firm*—Harness, Dickey & Pierce, PLC

[57] ABSTRACT

An adjustable damping shock absorber includes a pressure tube with a piston valve assembly slidably disposed within it. The piston valve assembly includes a compression valve assembly which is biased to a closed position and an extension valve assembly which is also biased to a closed position. The damping rate for the shock absorber is adjusted by selectively changing the biasing load of one or both of the valve assemblies. When the biasing load is increased, a firm damping for the shock absorber is produced. When the biasing load is decreased, a soft damping for the shock absorber is produced.

22 Claims, 5 Drawing Sheets

STEP MOTOR ACTUATED CONTINUOUS VARIABLE SHOCK ABSORBER

FIELD OF THE INVENTION

The present invention relates to a hydraulic damper or shock absorber adapted for use in a suspension system such as the suspension systems used for automotive vehicles. More particularly, the present invention relates to a hydraulic damper or shock absorber having a continuously variable damping characteristic which is adjustable by a stepper motor between a relatively low level of damping for a soft ride and a relatively high level of damping for a firm ride.

BACKGROUND OF THE INVENTION

A conventional prior art hydraulic damper or shock absorber comprises a cylinder which is adapted at one end for attachment to the sprung or unsprung mass of a vehicle. A piston is slidably disposed in the cylinder with the piston separating the interior of the cylinder into two liquid chambers. A piston rod is connected to the piston and extends out of one end of the cylinder where it is adapted for attachment to the other of the sprung or unsprung mass of the vehicle. A first valving system is incorporated within the piston for generating a damping force during the shock absorber's extension stroke of the piston with respect to the cylinder and a second valving system is incorporated within the piston for generating a damping force during the shock absorber's compression stroke of the piston with respect to the cylinder.

Various types of adjustment mechanisms have been developed to generate variable damping forces in relation to the speed and/or the amplitude of the displacement of the piston within the cylinder. These adjustment mechanisms have mainly been developed to provide a relatively small or low damping characteristic during the normal steady state running of the vehicle and a relatively large or high damping characteristic during vehicle maneuvers requiring extended suspension movements. The normal steady state running of the vehicle is accompanied by small or fine vibrations of the unsprung mass of the vehicle and thus the need for a soft ride or low damping characteristic of the suspension system to isolate the spring mass from these vibrations. During a turning or braking maneuver, as an example, the sprung mass of the vehicle will attempt to undergo a relatively slow and/or large vibration which then requires a firm ride or high damping characteristic of the suspension system to support the sprung mass and provide stable handling characteristics to the vehicle. These adjustable mechanisms for the damping rates of a shock absorber offer the advantage of a smooth steady state ride by isolating the high frequency/small excitations from the sprung mass while still providing the necessary damping or firm ride for the suspension system during vehicle maneuvers causing larger excitations of the sprung mass.

The continued development of shock absorbers includes the development of adjustment systems which provide the vehicle designed with a continuously variable system which can be specifically tailored to a vehicle to provide a specified amount of damping in relation to various monitored conditions of the vehicle and its suspension system.

SUMMARY OF THE INVENTION

The present invention provides the art with a continuously variable, bi-directional adjustable hydraulic damper or shock absorber that includes the capability of adjusting the damping rate of the shock absorber between a soft ride or low damping configuration and a firm ride or high damping configuration. A stepper motor adjusts the shock absorber between these two configurations and has the capability of positioning the shock absorber in the soft ride configuration, the firm ride configuration or any position between these two configurations to provide the continuously variable damping for the shock absorber.

Other advantages and objects of the present invention will become apparent to those skilled in the art from the subsequent detailed description, appended claims and drawings.

BRIEF DESCRIPTION OF THE DRAWINGS

In the drawings which illustrate the best mode presently contemplated for carrying out the present invention.

DETAILED DESCRIPTION OF THE PREFERRED EMBODIMENT

Figure 1:
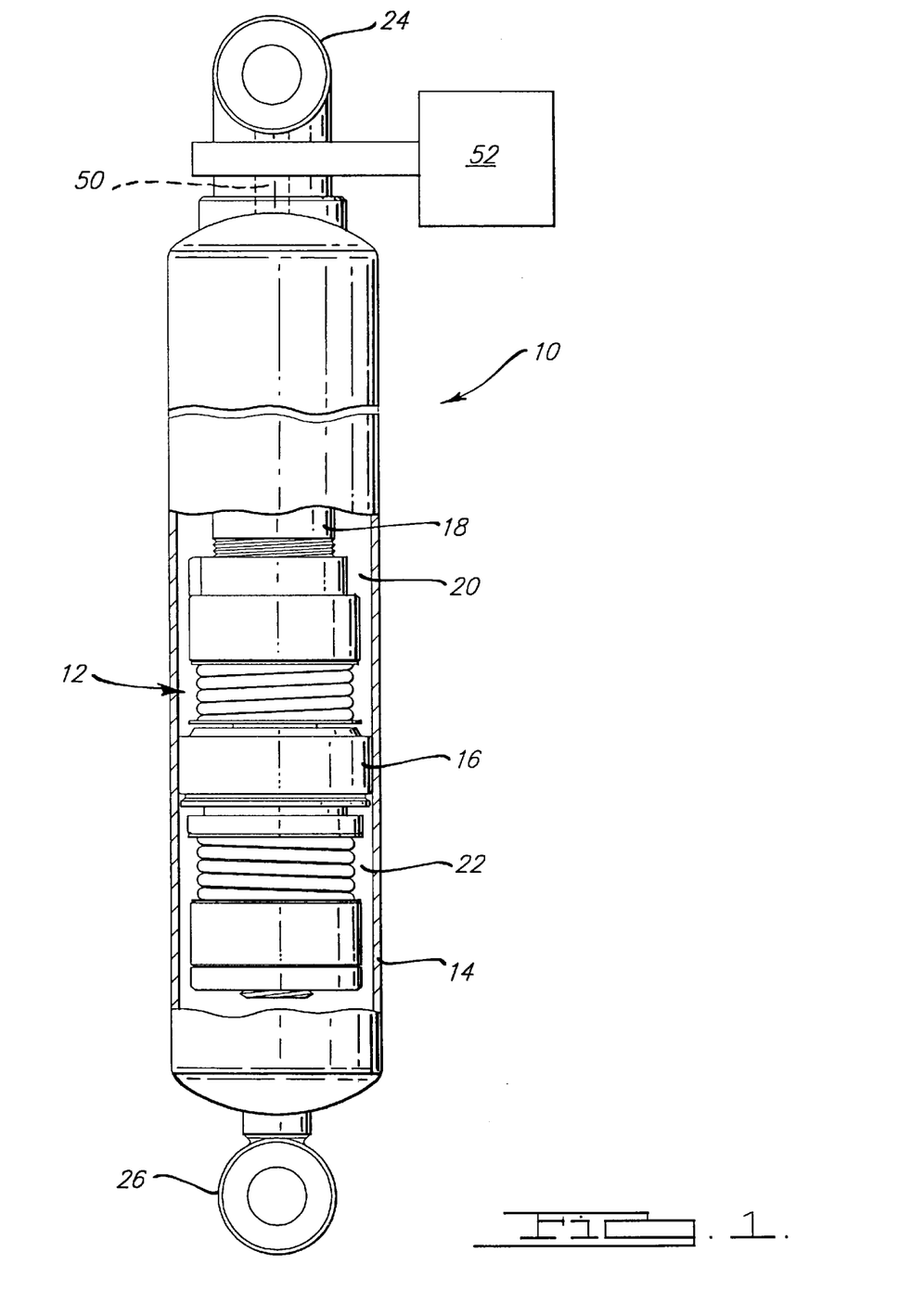
FIG. 1 is a cross-sectional side view of a shock absorber incorporating the continuously variable damping capabilities in accordance with the present invention.

Referring now to the drawings in which like reference numerals designate like or corresponding parts throughout the several views, there is shown in FIG. 1 a continuously variable shock absorber which incorporates an adjustment mechanism in accordance with the present invention and which is designated generally by the reference numeral 10. Shock absorber 10 is a monotube design, but may also be of a twin tube design, and comprises a piston rod assembly 12 and a pressure tube 14. Piston rod assembly 12 comprises a piston valve assembly 16 and a piston rod 18. Piston valve assembly 16 divides pressure tube 14 into an upper working chamber 20 and a lower working chamber 22. Piston rod 18 extends out of pressure tube 14 and includes a fitting 24 for attachment to one of the sprung or unsprung mass of the vehicle as well as providing access to the adjustment mechanism of shock absorber 10 as will be described later herein. Pressure tube 14 is filled with fluid and includes a fitting 26 for the attachment to the other of the sprung or unsprung mass of the vehicle. Thus, suspension movements of the vehicle will cause extension or compression movement of piston rod assembly 12 with respect to pressure tube 14 and these movements will be dampened due to the restricted fluid flow between chambers 20 and 22 through piston valve assembly 16.

Referring now to FIGS. 2–5, piston valve assembly 16 is attached to piston rod 18 and comprises a housing 30, an upper valve assembly 32, a valve body 34, a lower valve assembly 36, an attachment nut 38 and an adjustment mechanism 40 for switching piston valve assembly 16 between a soft damping characteristic and a firm damping characteristic. Housing 30 is threadingly secured to piston rod 18 and it includes a sleeve 42 which extends from piston rod 18 for the attachment of the remaining components of piston valve assembly 16. A washer 44 is disposed between housing 30 and piston rod 18. Washer 44 includes an aperture 46 which provides a stop for adjustment mechanism 40 as will be discussed later herein. Assembled to housing 30 is upper valve assembly 32, valve body 34 and lower valve assembly 36. Attachment nut 38 is threadingly received by sleeve 42 of housing 30 to retain these components on housing 30. Housing 30 defines a central bore 48 within which adjustment mechanism 40 is located. Adjustment mechanism 40 extends through bore 48 and through a bore 50 extending through piston rod 18. Bore 50 extends to the top of piston rod 18 adjacent fitting 24 where a stepper motor 52, shown schematically in FIG. 1, engages adjustment mechanism 40 to selectively move shock absorber 10 between its soft dampening characteristics and its firm damping characteristics. Housing 30 further defines three radially extending apertures 54, 56 and 58 which extend through housing 30 to intersect with bore 48 and provide routes for fluid flow.

Upper valve assembly 32 is disposed within upper working chamber 20 and it comprises an upper piston 60, an upper spacer 62, an upper valve plate 64, a lower valve plate 66 and an upper spring 68. Upper spacer 62 is slidingly received on housing 30 and spaces upper valve assembly 32 from valve body 34. Piston 60 is slidingly received by both housing 30 and upper spacer 62 and with housing 30 and spacer 62 defines a chamber 70 which receives pressurized fluid to switch shock absorber 10 between its soft ride characteristic and its firm ride characteristic. Fluid passageway 54 is in communication with chamber 70. A fluid passage 72 extends between chamber 70 and an annular groove 74 formed within piston 60. Upper valve plate 64 engages piston 60 and is urged against piston 60 by upper spring 68. Thus, pressurized fluid will build up within chamber 70 until the pressure overcomes the load exerted by upper spring 68 and the fluid within chamber 70 is dumped to upper working chamber 20 through fluid passage 72 and annular groove 74. By varying the size of passageway 72 in piston 60, the pressure drop across passage 72 can be adjusted to provide the desired amount of pressure buildup in chamber 70 before the unseating of upper valve plate 64. Lower valve plate 66 is disposed at the opposite end of upper spring 68 from upper valve plate 64. Lower valve plate 66 is urged against valve body 34 by upper spring 68 and functions as the main compression valve for piston valve assembly 16.

Valve body 34 is located between upper valve assembly 32 and lower valve assembly 36 adjacent to upper spacer 62. Valve body 34 divides pressure tube 14 into upper working chamber 20 and lower working chamber 22. Valve body 34 includes a seal 76 which engages pressure tube 14 to provide a seal between chambers 20 and 22. Valve body 34 defines a compression passageway 78 and an extension passageway 80, both which interconnect upper working chamber 20 with lower working chamber 22. Passageway 78 is open to lower working chamber 22 and is closed to upper working chamber 20 by lower valve plate 66 and the biasing of upper spring 68. Thus, fluid flow through passageway 78 is prohibited by lower valve plate 66. During a compression stroke of piston valve assembly 16, pressure builds up within lower working chamber 22 until the fluid pressure exerts sufficient load on lower valve plate 66 to overcome the load exerted by upper spring 68. When this load is overcome, fluid flows from lower working chamber 22 to upper working chamber 20 through compression passageway 78. Passageway 80 is open to upper working chamber 20 through a passageway 82 located in valve body 34, and is closed to lower working chamber 22 by lower valve assembly 36.

Lower valve assembly 36 is disposed within lower working chamber 22 and it comprises a two-piece lower spacer 84, an upper valve plate 86, a lower spring 88, a lower valve plate 90, and a piston 92. Lower spacer 84 is disposed adjacent to valve body 34 and extends between valve body 34 and attachment nut 38. Attachment nut 38 is threadingly received on housing 30 and functions to retain the components of piston valve assembly 16 onto housing 30. Lower spacer 84 includes an upper portion and a lower portion with the lower portion defining a fluid passageway 94 which communicates with passageway 58 in housing 30 for the actuation of lower valve assembly 36.

Upper valve plate 86 is disposed adjacent to valve body 34 and is biased against valve body 34 by lower spring 88 to close an annular groove 96 which is formed into valve body 34 in communication with passageway 80. The biasing of upper plate 86 against valve body 34 by lower spring 88 functions as the main extension valve for piston valve assembly 16. Thus, fluid flow through passageway 80 is prohibited by upper valve plate 86 and the biasing of lower spring 88. During an extension stroke of piston valve assembly 16, pressure builds up within upper working chamber 20 until the fluid pressure exerts sufficient load on upper valve plate 86 to overcome the load exerted by lower spring 88. When this load is overcome, fluid flows from upper working chamber 20 to lower working chamber 22 through extension passageway 80. Lower valve plate 90 is located at the opposite end of lower spring 88 from upper valve plate 86. Lower valve plate 90 is urged against piston 92 by lower spring 88. Piston 92 is slidingly received by both attachment nut 38 and lower spacer 84 and with nut 38 and spacer 84 defines a chamber 98 which receives pressurized fluid to switch shock absorber 10 between its soft ride characteristic and its firm ride characteristic. Fluid passageway 94 and 58 are in fluid communication with chamber 98. A fluid passageway 100 extends between chamber 98 and an annular groove 102 formed within piston 92. Lower valve plate 90 engages piston 92 and is urged against piston 92 by lower spring 88. Thus, pressurized fluid will build up within chamber 98 until the pressure overcomes the load exerted by lower spring 88 and the fluid within chamber 98 is dumped to lower working chamber 22. By varying the size of passage 100 in piston 92, the pressure drop across passage 100 can be adjusted to provide the desired amount of pressure buildup in chamber 98 before the unseating of lower valve plate 66.

Adjustment mechanism 40 controls fluid flow within piston valve assembly 16 and it comprises a control rod 110 and a valve member 112. Control rod 110 extends through bore 50 in piston 18 and is rotatably secured within bore 50 by a bushing 114 and a seal assembly 116. Control rod 110 extends adjacent to the top of piston rod 18 adjacent fitting 24 where it is coupled to stepper motor 52 such that stepper motor 52 rotates control rod 110. Control rod 110 extends into bore 48 and is mated with valve member 112 which is located within bore 48 such that rotation of control rod 110 causes rotation of valve member 112 to direct the fluid flow through adjustment mechanism 40. The rotation of valve member 112 and control rod 110 is limited by an extension 118 of valve member 112 which interfaces with aperture 46 in washer 44. Valve member 112 defines a central bore 120, a pair of lower external longitudinally extending grooves 122, a pair of upper external longitudinally extending grooves 124, shown in FIG. 3, and a radial aperture 126, also shown in FIG. 3, which extends between grooves 124 and central bore 120. Grooves 122 are circumferentially spaced from grooves 124 and aperture 126 in the preferred embodiment by 90°. Valve member 112 further defines an angular extending aperture 128, shown in FIG. 3, which extend from central bore 120 to the area adjacent extension 118 and washer 44 to provide pressure relief for the rotation of valve member 112. Valve member 112 and control rod 110 are retained within bores 48 and 50 by a seal 130 and a retainer 132 which are press fit into bore 48.

Figure 2:
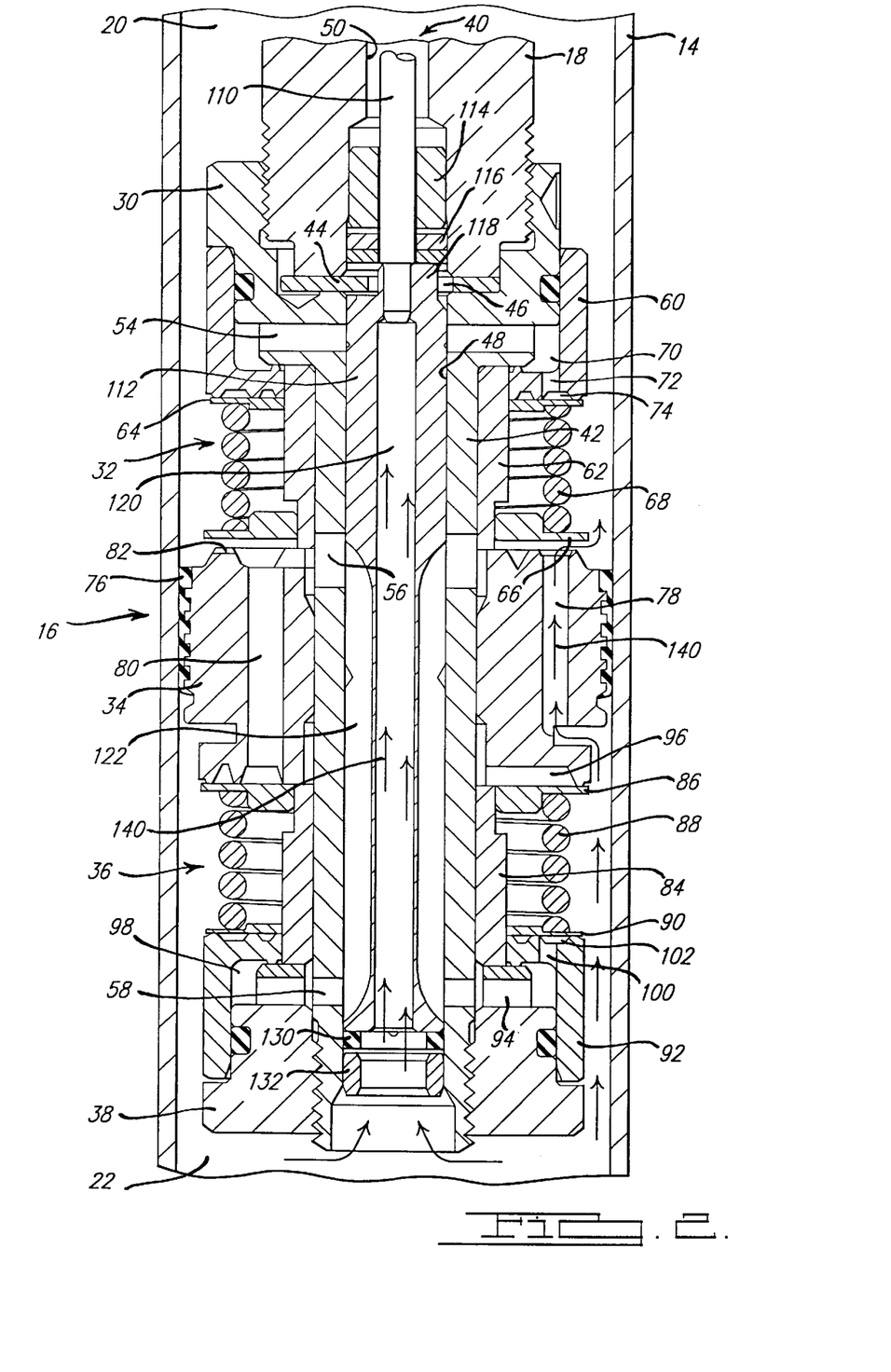
FIG. 2 is an enlarged cross-sectional side view illustrating the piston assembly of the shock absorber shown in FIG. 1 when the shock absorber is configured for soft damping in compression.
Figure 3:
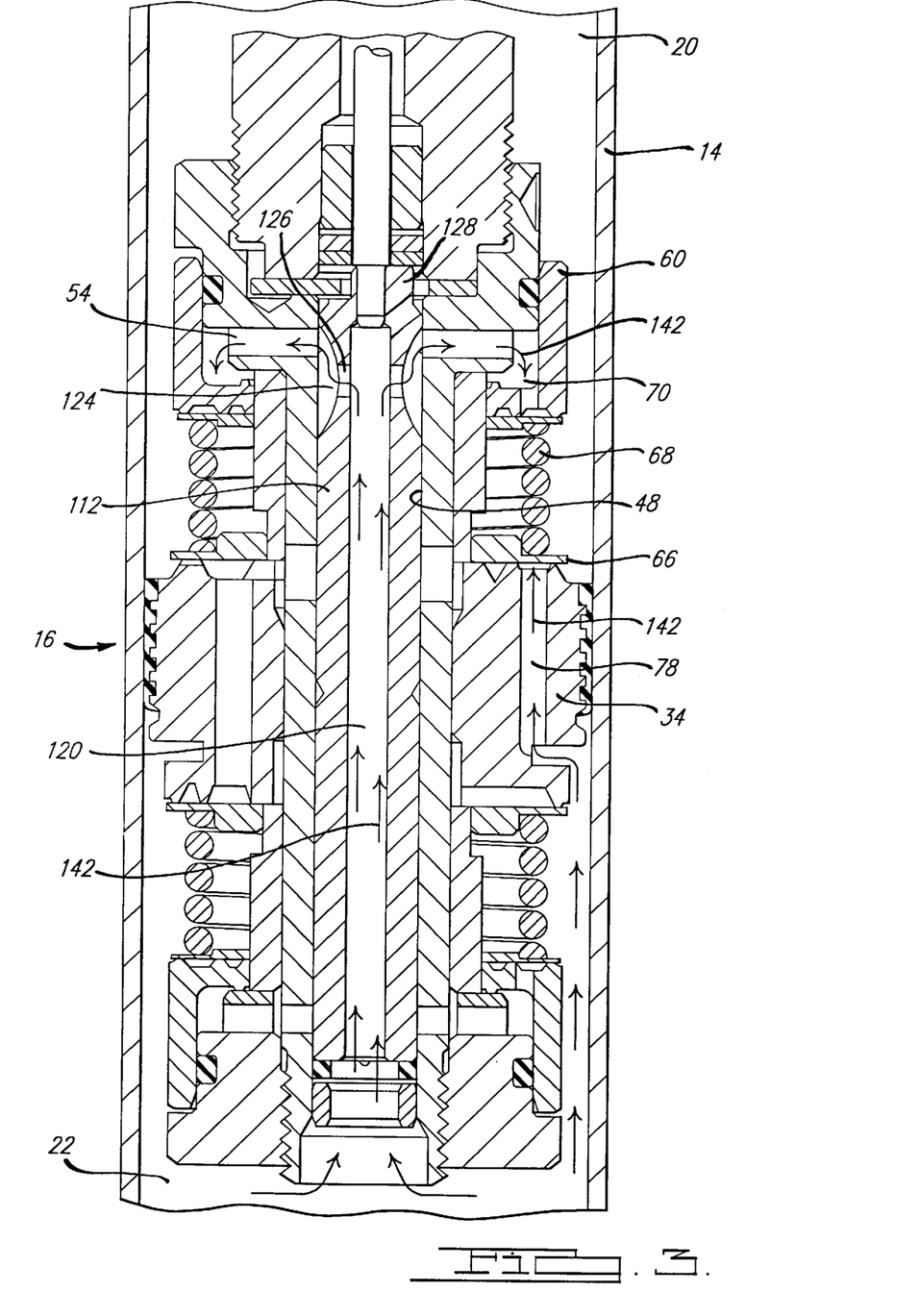
FIG. 3 is an enlarged cross-sectional side view illustrating the piston assembly of the shock absorber shown in FIG. 1 when the shock absorber is configured for hard damping in compression.
Figure 4:
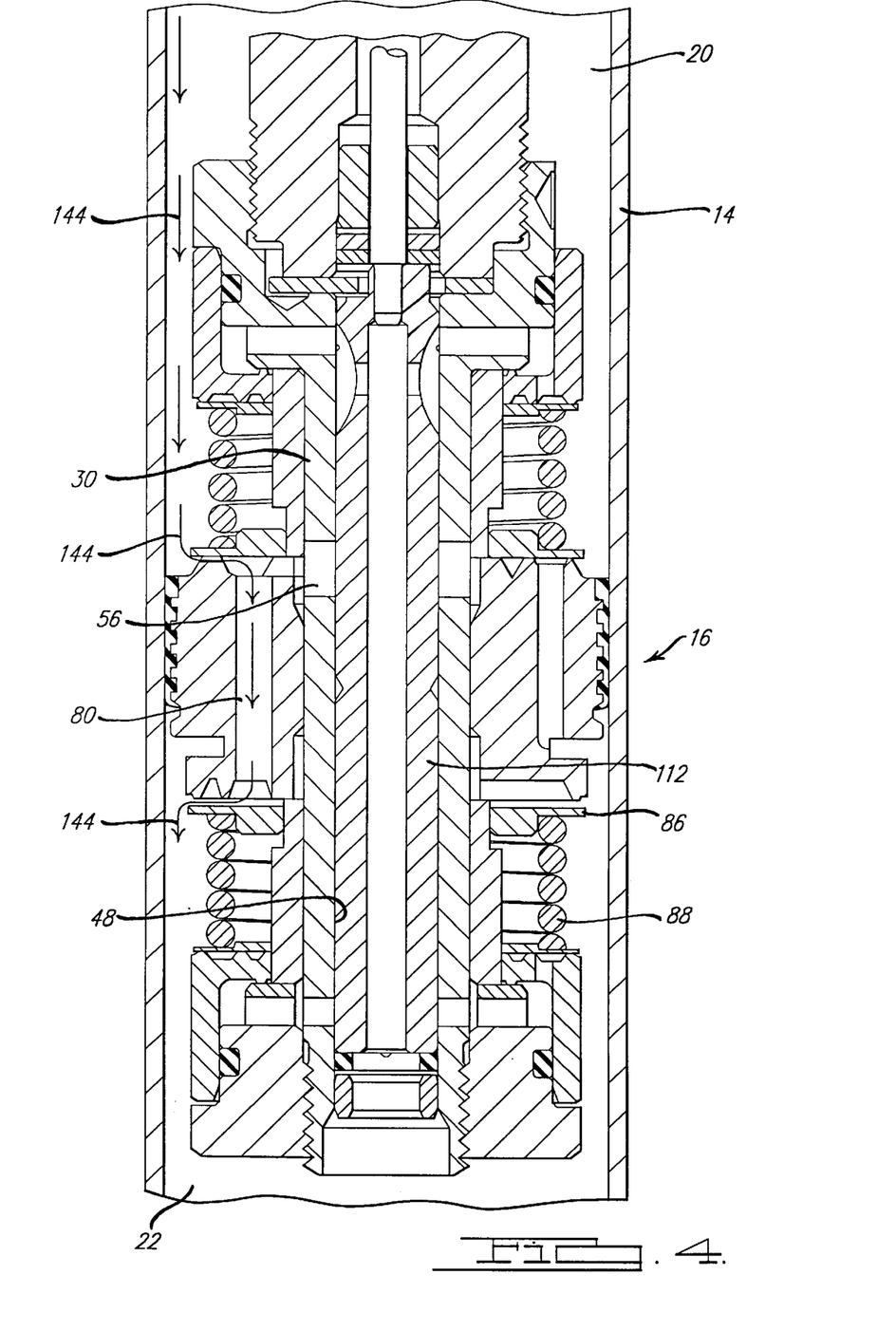
FIG. 4 is an enlarged cross-sectional side view illustrating the piston assembly of the shock absorber shown in FIG. 1 when the shock absorber is configured for soft damping in extension.
Figure 5:
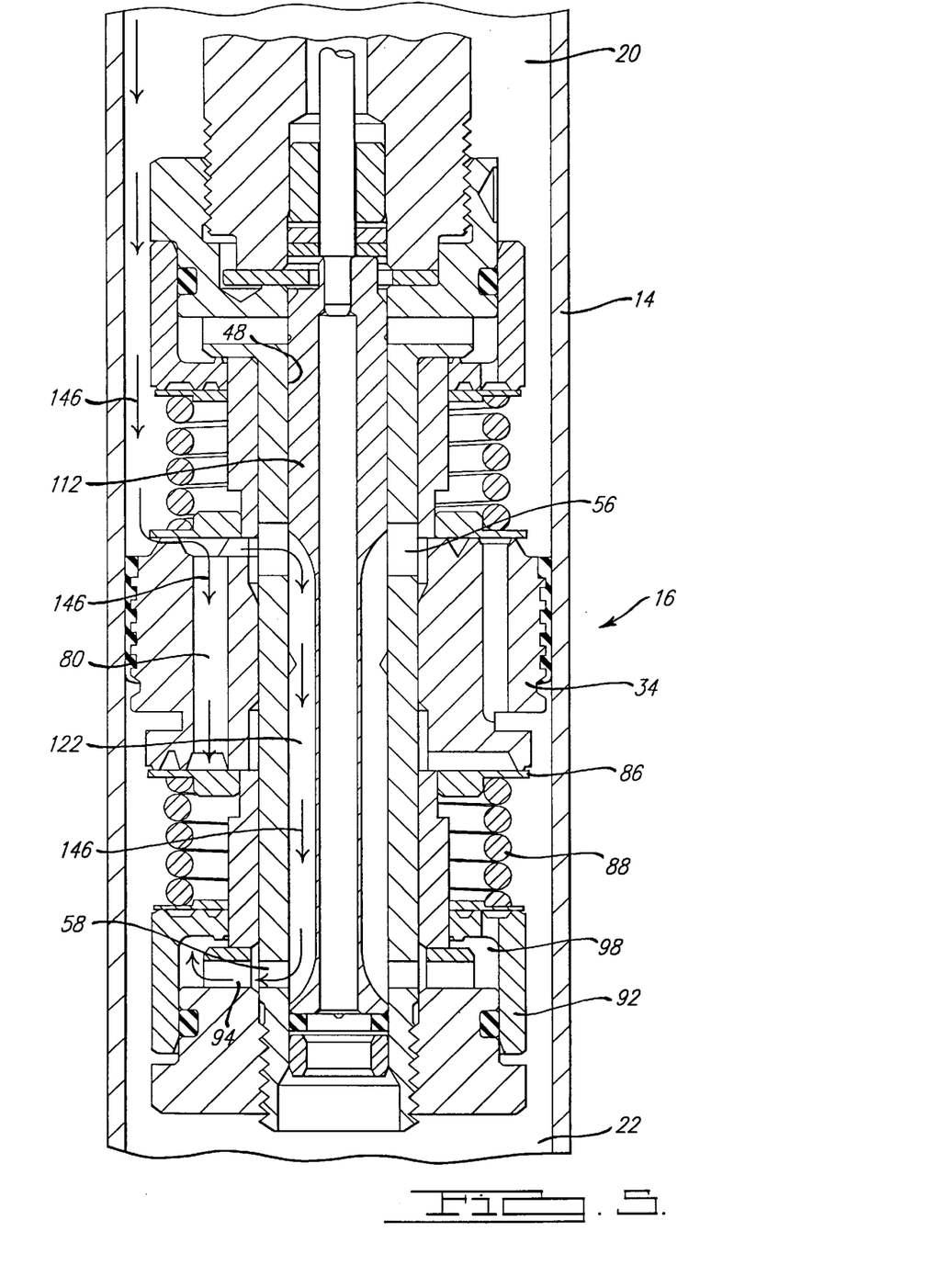
FIG. 5 is an enlarged cross-sectional side view illustrating the piston assembly of the shock absorber shown in FIG. 1 when the shock absorber is configured for hard damping in extension.

The operation of shock absorber 10 and the various damping characteristics which can be achieved by adjustment mechanism 40 are shown in FIGS. 2 through 5. FIG. 2 illustrates the configuration for soft compression, FIG. 3 illustrates the configuration for firm compression, FIG. 4 illustrates the configuration for soft extension and FIG. 5 illustrates the configuration for firm extension.

Referring now to FIG. 2, piston valve assembly 16 is shown configured to provide soft compression or firm extension for shock absorber 10. Arrows 140 depict fluid flow for the hydraulic fluid during soft compression of piston valve assembly 16 with respect to pressure tube 14. During the compression stroke of piston valve assembly 16, fluid within lower working chamber 22 is pressurized. This pressurization of fluid forces fluid up central bore 120 of valve member 112 where it meets a dead end due to the rotational position of valve member 112 within bore 48. Thus, all fluid flow is forced through compression passage 78 to overcome the biasing load of upper spring 68 to unseat lower valve plate 66 and provide soft damping to the movement of piston valve assembly 16. The force exerted by upper spring 68 is designed to be relatively low allowing for the unseating of lower valve plate 66 due to a relatively low pressure build up within lower working chamber 22 to provide a soft compression stroke for shock absorber 10.

Referring now to FIG. 3, piston valve assembly 16 is shown configured to provide firm compression or soft extension for shock absorber 10. Arrows 142 depict fluid flow for the hydraulic fluid during firm compression of piston valve assembly 16 with respect to pressure tube 14. During the compression stroke of piston valve assembly 16, fluid within lower working chamber 22 is pressurized. This pressurization of fluid forces fluid up central bore 120 of valve member 112 where it enters chamber 70 through apertures 126, grooves 124 and apertures 54 due to the rotational position of valve member 112 within bore 48. The pressurized fluid within chamber 70 reacts against upper piston 60 causing it to move downward as shown in FIG. 3 or towards valve body 34. The movement of upper piston 60 in this direction causes an increase in the load exerted upon lower valve plate 66 by upper spring 68. The remaining fluid flow is forced through compression passage 78 to overcome the biasing load of upper spring 68 to unseat lower valve plate 66 and provide a firm damping to the movement of piston valve assembly 16 due to the increase in biasing load of upper spring 68 caused by the movement of upper piston 60. The increase in force exerted by upper spring 68 is designed to be relatively high to provide for the unseating of lower valve plate 66 due to a relatively higher pressure build up within lower working chamber 22 to provide a firm compression stroke for shock absorber 10.

Referring now to FIG. 4, piston valve assembly 16 is shown configured to provide soft extension or firm compression for shock absorber 10. Arrows 144 depict fluid flow for the hydraulic fluid during soft extension of piston valve assembly 16 with respect to pressure tube 14. During the extension stroke of piston valve assembly 16, fluid within upper working chamber 20 is pressurized. This pressurization of fluid forces fluid into aperture 56 of housing 30 where it meets a dead end due to the rotational position of valve member 112 within bore 48. Thus, all fluid flow is forced through extension passage 80 to overcome the biasing load of lower spring 88 to unseat upper valve plate 86 and provide soft damping to the movement of piston valve assembly 16. The force exerted by lower spring 88 is designed to be relatively low allowing for the unseating of upper valve plate 86 due to a relatively low pressure build up within upper working chamber 20 to provide the soft extension for shock absorber 10.

Referring now to FIG. 5, piston valve assembly 16 is shown configured to provide firm extension or soft compression for shock absorber 10. Arrows 146 depict fluid flow for the hydraulic fluid during firm extension of piston valve assembly 16 with respect to pressure tube 14. During the extension stroke of piston valve assembly 16, fluid within upper working chamber 20 is pressurized. This pressurization of fluid forces fluid into apertures 56 of housing 30 where it enters chamber 98 through grooves 122, apertures 58, and apertures 94 due to the rotational position of valve member 112 within bore 48. The pressurized fluid within chamber 98 reacts against lower piston 92 causing it to move upward as shown in FIG. 5 or towards valve body 34. The movement of lower piston 98 in this direction causes an increase in the load exerted upon upper valve plate 86 by lower spring 88. The remaining fluid flow is forced through extension passage 80 to overcome the biasing load of lower spring 88 to unseat upper valve plate 86 and provide a firm damping to the movement of piston valve assembly 16 due to the increase in biasing load of lower spring 88 caused by the movement of lower piston 92. The increase in force exerted by lower spring 88 is designed to be relatively high to provide for the unseating of upper valve plate 86 due to a relatively higher pressure build up within upper working chamber 20 to provide a firm extension stroke for shock absorber 10.

While the above detailed description describes the preferred embodiment of the present invention, it should be understood that the present invention is susceptible to modification, variation and alteration without deviating from the scope and fair meaning of the subjoined claims.

What is claimed is:

1. An adjustable shock absorber comprising:
    a pressure tube defining a working chamber;
    a piston rod extending through said pressure tube and into said working chamber;
    a piston valve assembly slidably disposed within said pressure tube and connected to said piston rod, said piston valve assembly dividing said working chamber into an upper working chamber and a lower working chamber, said piston valve assembly comprising:
    a first valve assembly for controlling fluid flow through a first flow path extending between said upper and lower working chamber, said first valve assembly having a closed condition and an open condition;
    a first compression spring having a working height for exerting a load on said first valve assembly to urge said first valve assembly into said closed condition; and
    means for reducing said working height of said first compression spring such that said load exerted on said first valve assembly by said first compression spring is increased, said reducing means being accessed at a point exterior to said pressure tube.

2. The adjustable shock absorber according to claim 1 wherein said first valve assembly includes a valve body and a valve plate, said valve plate being urged against said valve body by said first compression spring.

3. The adjustable shock absorber according to claim 2 wherein said means for reducing said working height of said first compression spring includes a piston and said first compression spring is disposed between said piston and said valve plate, said piston being movable with respect to said compression spring to reduce said working height of said compression spring to increase said load.

4. The adjustable shock absorber according to claim 3 wherein pressurized hydraulic fluid reacts against said piston to cause movement of said piston.

5. The adjustable shock absorber according to claim 4 wherein said shock absorber further comprises a valve member disposed within said piston rod for selectively directing said hydraulic fluid between one of said upper and lower working chambers to a pressure chamber defined by said piston and said piston rod.

6. The adjustable shock absorber according to claim 1 wherein said means for reducing said working height of said first compression spring includes a piston and said first compression spring is disposed between said piston and said first valve assembly, said piston being movable with respect to said compression spring to reduce said working height of said compression spring to increase said load.

7. The adjustable shock absorber according to claim 6 wherein pressurized hydraulic fluid reacts against said piston to cause movement of said piston.

8. The adjustable shock absorber according to claim 7 wherein said shock absorber further comprises a valve member disposed within said piston rod for selectively directing said hydraulic fluid between one of said upper and lower working chambers to a pressure chamber defined by said piston and said piston rod.

9. The adjustable shock absorber according to claim 1 wherein said piston valve assembly further comprises:
    a second valve assembly for controlling fluid flow through a second flow path extending between said upper and lower working chamber, said second valve assembly having a closed condition and an open condition;
    a second compression spring having a working height for exerting a load on said second valve assembly to urge said second valve assembly into said closed condition; and
    means for reducing said working height of said second compression spring such that said load exerted by said second compression spring is increased.

10. The adjustable shock absorber according to claim 9 wherein said first valve assembly includes a first valve body and a first valve plate, said first valve plate being urged against said first valve body by said first compression spring and said second valve assembly includes a second valve body and a second valve plate, said second valve plate being urged against said second valve body by said second compression spring.

11. The adjustable shock absorber according to claim 10 wherein said means for reducing said working height of said first compression spring includes a first piston and said first compression spring is disposed between said first piston and said first valve plate, said first piston being movable with respect to said first compression spring to reduce the working height of said first compression spring to increase said load exerted by said first compression spring and said means for reducing said working height of said second compression spring includes a second piston and said second compression spring is disposed between said second piston and said second valve plate, said second piston being movable with respect to said second compression spring to reduce the working height of said second compression spring to increase said load exerted by said second compression spring.

12. The adjustable shock absorber according to claim 11 wherein pressurized hydraulic fluid reacts against said first piston to cause movement of said first piston and pressurized hydraulic fluid reacts against said second piston to cause movement of said second piston.

13. The adjustable shock absorber according to claim 12 wherein said shock absorber further comprises a valve member disposed within said piston rod for selectively directing said hydraulic fluid between one of said upper and lower working chambers to a first pressure chamber defined by said first piston and for selectively directing said hydraulic fluid between the other of said upper and lower working chambers to a second pressure chamber defined by said second piston and said piston rod.

14. The adjustable shock absorber according to claim 9 wherein said means for adjusting said load exerted by said first compression spring includes a first piston and said first compression spring includes a first spring disposed between said first piston and said first valve assembly, said first piston being movable with respect to said first spring to change the amount of compression on said first spring to adjust said load exerted by said first compression spring and said means for adjusting said load exerted by said second compression spring includes a second piston and said second compression spring includes a second spring disposed between said second piston and said second vale assembly, said second piston being movable with respect to said second spring to change the amount of compression on said second spring to adjust said load exerted by said second compression spring.

15. The adjustable shock absorber according to claim 14 wherein pressurized hydraulic fluid reacts against said first piston to cause movement of said first piston and pressurized hydraulic fluid reacts against said second piston to cause movement of said second piston.

16. The adjustable shock absorber according to claim 15 wherein said shock absorber further comprises a valve member disposed within said piston rod for selectively directing said hydraulic fluid between one of said upper and lower working chambers to a first pressure chamber defined by said first piston and said piston rod and for selectively directing said hydraulic fluid between the other of said upper and lower working chambers to a second pressure chamber defined by said second piston and said piston rod.

17. An adjustable shock absorber comprising:
    a pressure tube defining a working chamber;
    a piston rod extending through said pressure tube and into said working chamber;
    a valve body disposed between said piston rod and said pressure tube, said valve body being attached to said piston rod and dividing said working chamber into an upper working chamber and a lower working chamber, said valve body defining a first fluid flow path between said upper and lower working chambers;
    a first valve plate disposed adjacent to said valve body to close said first fluid flow path;
    a first piston disposed around said piston rod, said first piston and said piston rod forming a first pressure chamber;

a first compression spring having a working height disposed between said first piston and said first valve plate for exerting a first load for urging said first valve plate against said valve body; and a valve member disposed within said piston rod, said valve member defining a first groove for selectively directing pressurized hydraulic fluid from one of said upper and lower working chambers to said first pressure chamber such that said pressurized hydraulic fluid reacts against said first piston to move said first piston towards said first valve plate to reduce said working height of said first compression spring such that said load exerted by said first compression spring is increased.

18. The adjustable shock absorber according to claim 17 wherein said first piston defines a fluid passageway extending between said first pressure chamber and the other of said upper and lower working chambers and said shock absorber further comprises a second valve plate disposed between said first compression spring and said first piston to close said fluid passageway.

19. The adjustable shock absorber according to claim 17 wherein said valve body defines a second fluid flow path between said upper and lower working chambers and said shock absorber further comprises:

a second valve plate disposed adjacent to said valve body to close said second fluid flow path;

a second piston disposed around said piston rod, said second piston and said piston rod forming a second pressure chamber;

a second compression spring having a working height disposed between said second piston and said second valve plate for exerting a second load for urging said second valve plate against said valve body;

wherein said valve member defines a second groove for selectively directing pressurized hydraulic fluid from the other of said upper and lower working chambers to said second pressure chamber such that said pressurized hydraulic fluid reacts against said second piston to move said second piston towards said second valve plate to reduce said working height of said second compression spring such that said load exerted by said second compression spring is increased.

20. The adjustable shock absorber according to claim 19 wherein said first piston defines a first fluid passageway extending between said first pressure chamber and one of said upper and lower working chambers and said second piston defines a second fluid passageway extending between said second piston and the other of said upper and lower working chambers and said shock absorber further comprises a third valve plate disposed between said first compression spring and said first piston to close said first fluid passageway and a fourth valve plate disposed between said second compression spring and said second piston to close said second fluid passageway.

21. A method of adjusting damping rate for a shock absorber having a piston valve assembly slidably disposed within a pressure tube, said piston valve assembly including a first valve assembly for controlling fluid flow within said shock absorber during compression movement and a second valve assembly for controlling fluid flow within said shock absorber during extension movement, said method comprising the steps of:

providing a first compression spring having a working height such that a biasing load is produced for urging said first valve assembly into a closed condition; and selectively adjusting from a position exterior to said pressure tube said working height of said first compression spring to increase said biasing load to increase said damping rate during said compression movement.

22. The method of adjusting damping rate according to claim 21 further comprising the step of:

providing a second compression spring having a working height such that a biasing load is produced for urging said second valve assembly into a closed condition;

selectively adjusting from a position exterior to said pressure tube said working height of said second compression spring to increase said biasing load to increase said damping rate during said extension movement.

* * * * *

UNITED STATES PATENT AND TRADEMARK OFFICE
CERTIFICATE OF CORRECTION

PATENT NO. : 5,911,290
DATED : June 15, 1999
INVENTOR(S) : David L. Steed

It is certified that error appears in the above-identified patent and that said Letters Patent is hereby corrected as shown below:

Col. 3, line 20, delete "dampening" and substitute --damping-- therefor

Col. 8, line 34, claim 14, delete "vale" and substitute --valve-- therefor

Signed and Sealed this

Eighteenth Day of January, 2000

Attest:

Q. TODD DICKINSON

Attesting Officer

Commissioner of Patents and Trademarks